United States Patent
Paulsen et al.

(10) Patent No.: US 10,020,495 B2
(45) Date of Patent: Jul. 10, 2018

(54) GLASS-COATED CATHODE POWDERS FOR RECHARGEABLE BATTERIES

(75) Inventors: Jens Paulsen, Dae-jeon (KR); Randy De Palma, Seoul (KR); JiHye Kim, Cheon an (KR)

(73) Assignee: UMICORE, Brussels (BE)

( * ) Notice: Subject to any disclaimer, the term of this patent is extended or adjusted under 35 U.S.C. 154(b) by 814 days.

(21) Appl. No.: 14/009,165

(22) PCT Filed: Mar. 20, 2012

(86) PCT No.: PCT/EP2012/054883
§ 371 (c)(1),
(2), (4) Date: Mar. 5, 2014

(87) PCT Pub. No.: WO2012/136473
PCT Pub. Date: Oct. 11, 2012

(65) Prior Publication Data
US 2014/0170494 A1  Jun. 19, 2014

Related U.S. Application Data

(60) Provisional application No. 61/457,492, filed on Apr. 11, 2011.

(30) Foreign Application Priority Data

Apr. 6, 2011  (EP) .................................. 11002872

(51) Int. Cl.
*C04B 35/01*  (2006.01)
*C04B 35/16*  (2006.01)
(Continued)

(52) U.S. Cl.
CPC ............. *H01M 4/366* (2013.01); *C01B 33/32* (2013.01); *C04B 35/01* (2013.01); *C04B 35/016* (2013.01);
(Continued)

(58) Field of Classification Search
CPC ..................................................... H01M 4/366
See application file for complete search history.

(56) References Cited

U.S. PATENT DOCUMENTS

3,844,837 A * 10/1974 Bennion ............... H01M 4/583
29/623.1
5,856,045 A  1/1999 Fauteux et al.
(Continued)

FOREIGN PATENT DOCUMENTS

JP   H11-144736   * 12/1997 .............. H01M 4/62
JP   2005-38844   2/2005
(Continued)

OTHER PUBLICATIONS

JPH11-144736translation.*
(Continued)

*Primary Examiner* — Sarah A. Slifka
*Assistant Examiner* — Brian R Ohara
(74) *Attorney, Agent, or Firm* — NK Patent Law, PLLC

(57) ABSTRACT

The invention provides a cathode active material for use in a rechargeable battery, comprising a coated lithium nickel oxide powder or a coated lithium nickel manganese oxide powder, the powder being composed of primary particles provided with a glassy lithium silicate surface coating. A method for preparing the cathode active material comprises the steps of:
  providing a lithium transition metal based oxide powder,
  providing an alkali mineral compound comprising a $Li_{2-x}SiO_{3-0.5x}$ compound, wherein $0<x<2$,
  mixing the lithium transition metal based oxide powder and the alkali mineral compound to form a powder-mineral compound mixture, and
  heat treating the mixture at a temperature T whereby lithium is extracted from the surface of the metal based oxide powder to react with the alkali mineral com-
(Continued)

pound, and a glassy surface coating is formed comprising a $Li_{2-x''}SiO_{3-0.5x''}$ compound, wherein $x<x''<2$.

22 Claims, 5 Drawing Sheets

(51) Int. Cl.
| | | |
|---|---|---|
| C04B 35/628 | (2006.01) | |
| C01B 33/32 | (2006.01) | |
| H01M 4/36 | (2006.01) | |
| H01M 4/04 | (2006.01) | |
| H01M 4/131 | (2010.01) | |
| H01M 4/1391 | (2010.01) | |
| H01M 4/505 | (2010.01) | |
| H01M 4/525 | (2010.01) | |
| H01M 4/62 | (2006.01) | |
| H01M 10/0525 | (2010.01) | |

(52) U.S. Cl.
CPC ........ *C04B 35/16* (2013.01); *C04B 35/62802* (2013.01); *C04B 35/62886* (2013.01); *H01M 4/0471* (2013.01); *H01M 4/131* (2013.01); *H01M 4/1391* (2013.01); *H01M 4/505* (2013.01); *H01M 4/525* (2013.01); *H01M 4/62* (2013.01); *C01P 2004/03* (2013.01); *C04B 2235/3203* (2013.01); *C04B 2235/3208* (2013.01); *C04B 2235/3213* (2013.01); *C04B 2235/3217* (2013.01); *C04B 2235/3225* (2013.01); *C04B 2235/3227* (2013.01); *C04B 2235/3229* (2013.01); *C04B 2235/3244* (2013.01); *C04B 2235/3262* (2013.01); *C04B 2235/3275* (2013.01); *C04B 2235/3279* (2013.01); *C04B 2235/3409* (2013.01); *C04B 2235/36* (2013.01); *C04B 2235/447* (2013.01); *C04B 2235/72* (2013.01); *C04B 2235/727* (2013.01); *C04B 2235/728* (2013.01); *H01M 10/0525* (2013.01)

(56) References Cited

U.S. PATENT DOCUMENTS

| | | | |
|---|---|---|---|
| 6,555,026 | B1 | 4/2003 | Barker et al. |
| 7,419,746 | B2 | 9/2008 | Ugaji et al. |
| 2002/0012846 | A1* | 1/2002 | Skotheim ............ H01M 2/1673 429/231.95 |
| 2002/0141937 | A1* | 10/2002 | Howard, Jr. .......... H01M 4/131 423/599 |
| 2003/0148182 | A1 | 8/2003 | Park et al. |
| 2005/0208384 | A1* | 9/2005 | Yanai ...................... H01M 4/13 429/329 |
| 2006/0071198 | A1* | 4/2006 | Paulsen .............. C01G 45/1228 252/500 |
| 2007/0292759 | A1* | 12/2007 | Ugaji .................... H01M 4/131 429/223 |
| 2008/0131778 | A1* | 6/2008 | Watanabe ............. H01M 4/131 429/220 |
| 2009/0047577 | A1* | 2/2009 | Iwamoto ............. H01M 4/0423 429/218.1 |
| 2009/0226810 | A1 | 9/2009 | Paulsen et al. |
| 2010/0190058 | A1 | 7/2010 | Thackeray et al. |
| 2010/0308278 | A1 | 12/2010 | Kepler et al. |
| 2011/0260099 | A1* | 10/2011 | Paulsen ................ C01G 53/006 252/182.1 |

FOREIGN PATENT DOCUMENTS

| | | | |
|---|---|---|---|
| KR | 2004-0098139 | 11/2004 | |
| WO | WO 2002/061865 | 8/2002 | |
| WO | WO 2009/021651 | 2/2009 | |
| WO | WO2009021651 A1 * | 2/2009 | .......... C01G 53/006 |
| WO | WO 2010/094394 | 8/2010 | |

OTHER PUBLICATIONS

Amatucci, G.G., et al., "Surface Treatments of $Li_{1+x}Mn_{2-x}O_4$ Spinels for Improved Elevated Temperature Performance", *Solid State Ionics*, vol. 104, No. 1-2, Dec. 1, 1997, pp. 13-25.

Chan, H.W. et al., "Electrochemical Performance of LBO-Coated Spinel Lithium Manganese Oxide as Cathode Material for Li-ion Battery", *Surface and Coatings Technology*, vol. 188-189, Nov. 1, 2004, pp. 116-119.

Sakuda, Atsushi et al., "Modification of Interface Between $LiCoO_2$ Electrode and $Li_2SP_2S_5$ Solid Electrolyte Using $Li_2O\ SiO_2$ Glassy Layers", *Journal of the Electrochemical Society*, Manchester, New Hampshire, vol. 156, No. 1, Jan. 1, 2009, pp. A27-A32.

* cited by examiner

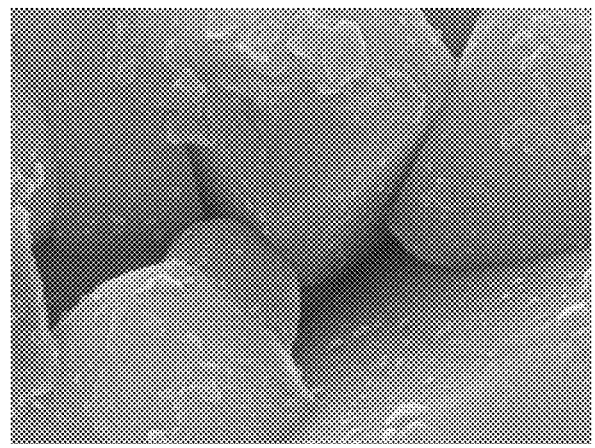
Figure 3.1  ↔100 nm
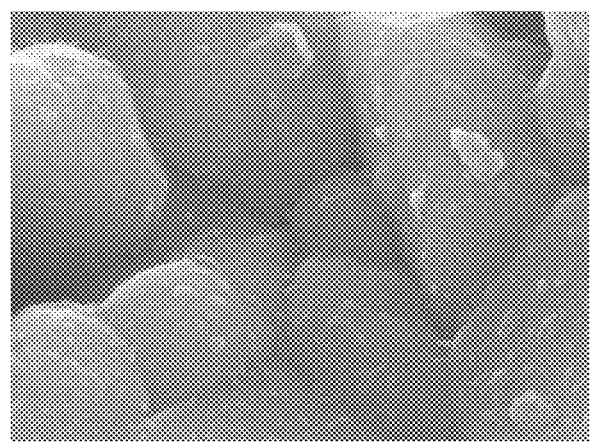
Figure 3.2
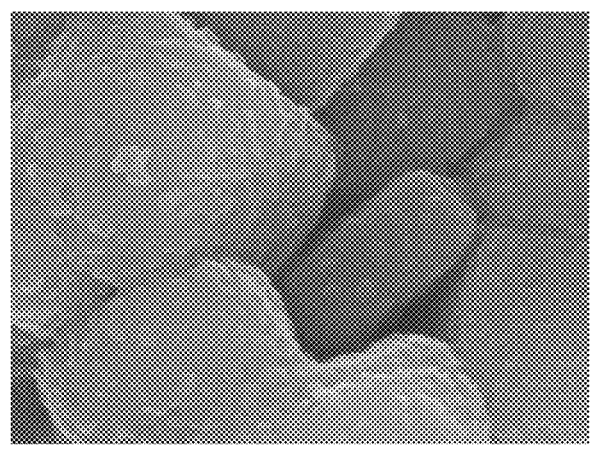
Figure 3.3

GLASS-COATED CATHODE POWDERS FOR RECHARGEABLE BATTERIES

This application is a National Stage application of International Application No. PCT/EP2012/054883, filed Mar. 20, 2012, which claims the benefit of U.S. Provisional Application No. 61/457,492, filed Apr. 11, 2011. This application also claims priority under 35 U.S.C. § 119 to European Patent Application No. 11002872.7, filed Apr. 6, 2011.

TECHNICAL FIELD AND BACKGROUND

The present invention relates to lithium transition metal oxide based powders for use in a rechargeable battery, that are coated with a lithium absorbing glassy coating. In particular high nickel containing powders are used, in order to improve their high temperature stability.

Previously $LiCoO_2$ was the most used cathode material for rechargeable lithium batteries. However, a substitution of $LiCoO_2$ by lithium nickel oxide based cathodes and by lithium nickel manganese cobalt oxides has recently started. In these substitute materials, depending on the choice of metal composition, different limitations occur or challenges still need to be solved. For simplicity reasons, the term "Lithium nickel oxide based cathodes" will be further referred to as "LNO", and "lithium nickel manganese cobalt oxides" will be further referred to as "LNMCO".

One example of an LNO material is $LiNi_{0.80}Co_{0.15}Al_{0.05}O_2$. There is also a special class of LNO material described in WO2010-094394. It concerns a material with general formula $Li_aNi_xCo_yM_zO_{2\pm e}A_f$, with $0.9 < a < 1.1$, $0.3 \leq x \leq 0.9$, $0 \leq y \leq 0.4$, $0 < z \leq 0.35$, $e < 0.02$, $0 \leq f \leq 0.05$ and $0.9 < (x+y+z+f) < 1.1$; M consisting of either one or more elements from the group Al, Mg, and Ti; A consisting of either one or both of S and C, and wherein the material composition—i.e. its Ni and M content—is dependent on the particle size. LNO has a high capacity, however it is difficult to prepare, since typically a carbon dioxide free atmosphere (e.g. a pure oxygen atmosphere) is needed and special carbonate free precursors—like lithium hydroxide—are used, instead of lithium carbonate. Hence such manufacturing restraints tend to increase the cost of this material considerably.

LNO is also a very sensitive cathode material. It is not fully stable in air, which makes large scale battery production more difficult, and in real batteries—due to its low thermodynamic stability—it is responsible for a poor safety record. Finally, it is very difficult to produce lithium nickel oxide with a low content of soluble base: it is known that lithium located near to the surface is thermodynamically less stable and can go into solution, but lithium in the bulk is thermodynamically stable and cannot go to dissolution. Thus a gradient of Li stability exists, between lower stability at the surface and higher stability in the bulk. By determining the "soluble base" content by pH titration, based on the ion exchange reaction ($LiMO_2+\delta$ $H^+ \leftarrow \rightarrow Li_{1-\delta}H_\delta MO_2+\delta$ $Li^+$, M being one or more transition metals), the Li gradient can be established. The extent of this reaction is a surface property. The soluble base can be of the LiOH or the $Li_2CO_3$ type, as is described in co-pending application EP11000945.3.

In US2009/0226810A1 the problem of soluble base is further discussed. The 'soluble base' problem is severe because a high base content is often connected with problems during battery manufacturing: during slurry making and coating high base causes a degradation of the slurry (slurry instability, gelation) and high base is also a responsible for poor high temperature properties, like excessive gas generation (swelling of the batteries) during high temperature exposure. In the case of a flexible casing, for example in all designs like prismatic or pouch type—with the exception of cylindrical cells—the cell bulges which is a failure of the battery.

An example of LNMCO is the well known $Li_{1+x}M_{1-x}O_2$ with $M=Mn_{1/3}Ni_{1/3}Co_{1/3}O_2$, where the manganese and nickel content is about the same. "LNMCO" cathodes are very robust, easy to prepare, have a relatively low content of cobalt and thus generally tend to cost less. Their main drawback is a relatively low reversible capacity. Typically, between 4.3 and 3.0V the capacity is less than or about 160 mAh/g, compared with 180-190 mAh/g for LNO cathodes. A further drawback of LNMCO compared with LNO is the relatively low crystallographic density—so the volumetric capacity is also less—and a relatively low electronic conductivity.

In between LNO and LNMCO type materials we can situate "Nickel rich lithium nickel manganese cobalt oxides" $Li_{1+x}M_{1-x}O_2$ where $M=Ni_{1-x-y}Mn_xCo_y$ or $M=Ni_{1-x-y-z}Mn_xCo_yAl_z$, with Ni:Mn larger than 1, i.e. typically values for Ni:Mn of 1.5 to 3, and a Co content "y" typically between 0.1 and 0.3 ($0.1 \leq y \leq 0.3$), and $0 \leq z \leq 0.05$. For simplicity we refer to this class of materials as "LNMO". Examples are $M=Ni_{0.5}Mn_{0.3}Co_{0.2}$, $M=Ni_{0.67}Mn_{0.22}Co_{0.11}$, and $M=Ni_{0.6}Mn_{0.2}Co_{0.2}$. A special class of LNMO material is described in WO2009/021651. It concerns $Li_{1+a}M_{1-a}O_{2\pm b}M'_kS_m$ with $-0.03<a<0.06$, $b \cong 0$ (or $b<0.02$), M being a transition metal composition, with at least 95% of M consisting of either one or more elements of the group Ni, Mn, Co and Ti; Mn, Co and Ti; M' being present on the surface of the powderous oxide, and M' consisting of either one or more elements of the group Ca, Sr, Y, La, Ce and Zr, with $0.0250<k \leq 0.1$ in wt %; and $0.15<m \leq 0.6$, m being expressed in mol %.

Compared with LNO, LNMO can be prepared by standard processes (using a $Li_2CO_3$ precursor) and no special gas—such as oxygen—is needed. Compared to LNMCO, LNMO has a much higher intrinsic capacity and possibly a lower tendency to react with electrolyte (which is normally characterized by dissolution of Mn) at elevated temperature. Thus it becomes apparent that LNMO plays a major role in the substitution of $LiCoO_2$. Generally, the base content increases, and the safety performance tends to deteriorate with increasing Ni:Mn ratio.

In LNO most of the Ni is divalent. In LNMO some nickel is divalent and some nickel is trivalent. Generally there exist a tendency that with increasing Ni(3+)

(1) reversible capacity (at given voltage range) increases,
(2) it becomes more difficult to prepare high quality product,
(3) the product becomes more sensitive (for moisture, air exposure etc.), and
(4) the content of soluble base increases.

Generally LNO has a very high base content and LNMCO a relatively low content. LNMO has less base than LNO but more than LNMCO. It is widely accepted that high Mn content helps to improve safety.

A high base content is related to moisture sensitivity. In this regard LNMO is less moisture sensitive than LNO but more sensitive than LNMCO. Directly after preparation, a well prepared LNMO sample has a relatively low content of surface base, and if it is well prepared most of the surface base is not $Li_2CO_3$ type base. However, in the presence of moisture, airborn $CO_2$ or organic radicals reacts with LiOH type base to form $Li_2CO_3$ type base. Similar, the consumed LiOH is slowly re-created by Li from the bulk, thus increasing the total base (total base=mol of $Li_2CO_3$+LiOH type base). At the same time, the moisture (ppm $H_2O$) increases. These processes are very bad for battery making. $Li_2CO_3$ and moisture are known to cause severe swelling, and to deteriorate the slurry stability. Hence it is desired to decrease the moisture sensitivity of LNMO and LNO materials.

Thermal stability (safety) is related to interfacial stability between electrolyte and cathode material. A typical approach to improve the surface stability is by coating. Many different examples of conventional coatings are available in literature in general and in patent literature in particular. There are different ways to categorize coatings. For example, we can distinguish between ex-situ and in-situ coating. In ex-situ coating a layer is coated onto the particles. The coating can be obtained by dry or wet coating. Generally the coating is applied in a separate process involving at least the coating step and generally an additional heating step. Thus the total cost of the process is high. Alternatively, in some cases an in-situ coating—or self organized coating—is possible. In this case the coating material is added to the precursor blend before cooking, and during cooking separate phases form, preferable the coating phase becomes liquid, and if the wetting between $LiMO_2$ and the coating phase is strong then a thin and dense coating phase ultimately covers the electrochemical active $LiMO_2$ phase. Evidently, in-situ coating is only efficient if the coating phase wets the core.

We can also distinguish between cationic and anionic coating. An example of cationic coating is $Al_2O_3$ coating. Examples for anionic coating are fluoride, phosphate, silicate coating and the like. In US2010/0190058 lithium metal oxide particles are provided with a coating of lithium-metal-polyanionic, lithium-metal-phosphate or lithium-metal-silicate compounds. The coating compounds are fully lithiated and are not able to bind lithium situated at the surface of the metal oxide particles.

We can further distinguish between inorganic and organic coatings. An example of an organic coating is a polymer coating. One advantage of polymer coating is the possibility of obtaining an elastic coating. On the other hand, problems arise from poor electronic conductivity, and sometimes the poor transport of lithium across the polymer. Generally, a polymer coating more or less adheres to the surface, but it does not chemically change the surface.

There cannot be found any experimental data in the prior art that would show that the above described approaches are effective to improve the cited limitations of LNO and LNMO materials. The present invention discloses a new unified approach to deal with all of the above mentioned shortcomings, with focus on lower content of soluble base but also addressing thermal stability and moisture sensitivity.

To summarize:
(1) LNMCO is a robust material but has severe capacity limitations,
(2) LNO has very high capacity but is very sensitive and requires expensive preparation route. Its stability needs to improve, and a lower content of soluble base is preferred,
(3) LNMO can be prepared by a cheap route. It has high capacity but stability needs to improve. Also a lower content of soluble base is preferred.

The present invention aims to improve the stability of LNO and LNMO materials, and to provide LNMO as a high capacity alternative for LNMCO materials.

SUMMARY

Viewed from a first aspect, the invention can provide a cathode active material for use in a rechargeable battery, comprising a coated nickel oxide powder or a coated nickel manganese oxide powder, the powder being composed of primary particles provided with a glassy surface coating having lithium accepting properties. In one embodiment, the glassy surface coating comprises lithium. In another embodiment, the coating further comprises either one of a phosphate and borate com-pound. The silicate, phosphate and borate compound may be respectively a $Li_{2-x}SiO_{3-0.5x}$, $Li_{3-2y}PO_{4-y}$ and $Li_{3-2z}BO_{3-z}$ compound, wherein $0<x<2$; $0<y<1.5$ and $0<z<1.5$. The lithium accepting properties of these compounds are characterised by the following chemical reactions:

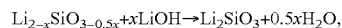

In one embodiment, $0<x<1.6$ or even $1<x\leq1.5$; $0<y<1$ and $0<z<1$. One particular lithium accepting silicate compound is $Li_2Si_5O_{11}$. In another embodiment the glassy coating compound has a composition gradient, wherein the value of either one of x, y and z at the surface of the primary particles is lower than the value of x, y and z at the outer surface of the glassy coating. In other embodiments, the coating consists of either one or more nano-composites of $Li_2Si_5O_{11}$ and $Li_2SiO_3$ particles, $LiPO_3$ and $Li_3PO_4$ particles, and $LiBO_2$ and $Li_3BO_3$ particles.

It should be mentioned here that WO02/061865A2 discloses a coated lithium transition metal oxide powder composed of primary particles provided with a glassy surface coating, in particular $Li_2SiO_3$ and $Li_4SiO_4$. These silicate compounds however have no lithium accepting properties as described above.

In the *Journal of The Electrochemical Society*, 156 (1), A27-A32 (2009), a coated lithium transition metal oxide powder is disclosed, composed of primary particles provided with a glassy surface coating, in particular $Li_2SiO_3$ or $SiO_2$. These compounds however have no lithium accepting properties.

In US2003/148182A1 a coated lithium transition metal oxide powder is disclosed, composed of primary particles provided with a glassy surface coating, in particular $LiO_2$—$SiO_2$. This compound has no lithium accepting properties.

The cathode active material may have primary particles that are either one of

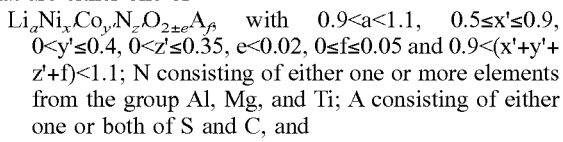 with $0.9<a<1.1$, $0.5\leq x'\leq0.9$, $0<y'\leq0.4$, $0<z'\leq0.35$, $e<0.02$, $0\leq f\leq0.05$ and $0.9<(x'+y'+z'+f)<1.1$; N consisting of either one or more elements from the group Al, Mg, and Ti; A consisting of either one or both of S and C, and

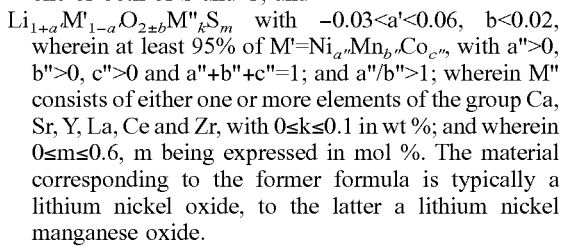 with $-0.03<a'<0.06$, $b<0.02$, wherein at least 95% of $M'=Ni_{a''}Mn_{b''}Co_{c''}$, with $a''>0$, $b''>0$, $c''>0$ and $a''+b''+c''=1$; and $a''/b''>1$; wherein M'' consists of either one or more elements of the group Ca, Sr, Y, La, Ce and Zr, with $0\leq k\leq0.1$ in wt %; and wherein $0\leq m\leq0.6$, m being expressed in mol %. The material corresponding to the former formula is typically a lithium nickel oxide, to the latter a lithium nickel manganese oxide.

Viewed from a second aspect, the invention can provide a method for preparing the cathode active material as described above, comprising the steps of:

providing a lithium transition metal based oxide powder, providing an alkali mineral compound comprising either one or more of a $Li_{2-x}SiO_{3-0.5x}$, $Li_{3-2y}PO_{4-y}$ and $Li_{3-2z}BO_{3-z}$ compound, wherein $0<x<2$; $0<y<1.5$ and $0<z<1.5$, mixing the lithium transition metal based oxide powder and the alkali mineral compound to form a powder-mineral compound mixture, and heat treating the mixture at a temperature T whereby lithium is extracted from the surface of the metal based oxide powder to react with the alkali mineral compound, mostly between 300 and 500° C., and a glassy surface coating is formed comprising either one or more of a $Li_{2-x''}SiO_{3-0.5x''}$, $Li_{3-2y''}PO_{4-y''}$ and $Li_{3-2z''}BO_{3-z''}$ compound, wherein x<x"<2; y<y"<1.5 and z<z"<1.5. The lithium transition metal based oxide powder may be either a lithium nickel oxide powder or a lithium nickel manganese oxide powder. In one embodiment the alkali mineral compound is provided as an aqueous solution of the alkali mineral compound, and during the heat treatment of the mixture water from the solution is evaporated and the compound is dried to form a glassy coating on the surface of the metal based oxide powder. The heat treatment of the mixture may be performed at a temperature T between 300 and 500° C., and preferably between 350 and 450° C., for at least one hour.

Viewed form a third aspect, the invention can provide the use of the cathode active material described before in a lithium-ion prismatic or polymer battery.

Obviously it is desired to increase the reversible capacity of the LNMO by increasing the Ni content, but by doing this, the soluble base content increases and safety deteriorates. The current invention discloses a novel glass-coated cathode material as well as a process to produce the material, where the cathode material has significantly reduced soluble base content and improved safety. At the same time the reversible capacity is further increased, when compared with a pristine cathode material with same composition of the core. In one embodiment the glass coating is obtained by two steps: first a thin film of glassy coating is obtained by wet coating the cathode particles with a water glass solution, followed by evaporating moisture and drying, then in a second step a secondary coating is achieved by a heat treatment within a narrow temperature range (typically 300-500° C.) where the glass reacts with the surface base and a secondary coating layer is formed.

BRIEF DESCRIPTION OF THE DRAWINGS

FIG. 3.1 shows a high resolution SEM of the Li-silicate coated EX sample, heat-treated at 200° C.

FIG. 3.2 shows a high resolution SEM of the Li-silicate coated EX sample, heat-treated at 400° C.

FIG. 3.3 shows a high resolution SEM of the Li-silicate coated EX sample, heat-treated at 600° C.

DETAILED DESCRIPTION OF THE INVENTION

Figure 1:
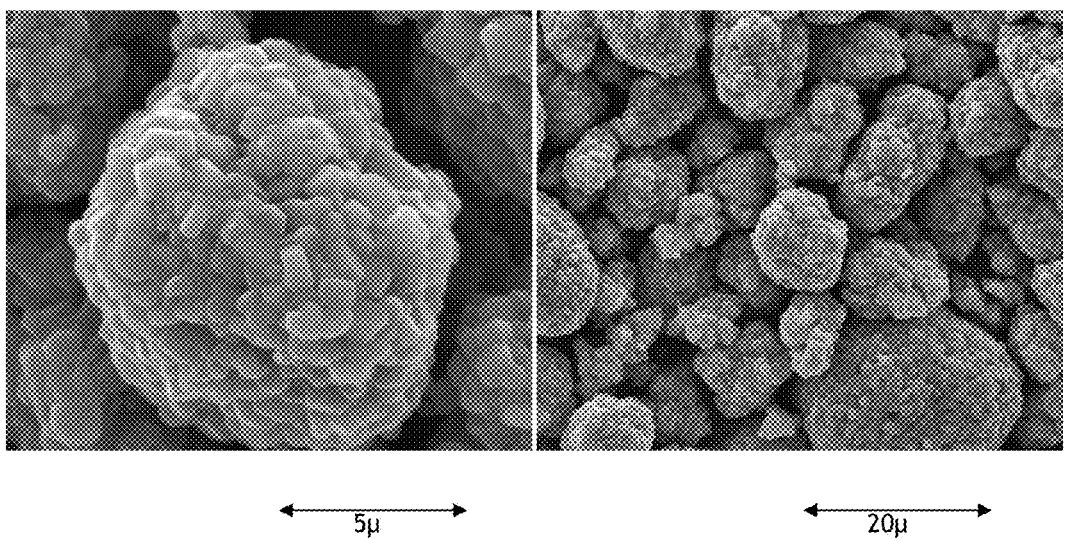
FIG. 1 shows a SEM micrograph of uncoated cathode precursor.

The powderous cathode material of the current invention is a coated material. The surface of the powder particles may be fully covered by a thin coated film. The coating layer is a secondary coating, it is different from the initially applied primary or pristine coating. Aspects of the primary and secondary coating are described in the following:

A dense surface coverage: a successful coating my require a full surface coverage by the coating film. Full surface coverage may be achieved by either of the following methods:

1) Dry (powder) coating followed by a heat treatment which involves the melting of the dry powder, to provide a liquid with excellent wetting properties, whereafter the surface will become homogeneously coated by a thin liquid film. After cooling to a temperature below the melting point a solid, dense coating film is obtained.

2) Dry nano powder coating followed by a heat treatment which involves a soft sintering of the dry nano powder, whereby the powder adheres to the surface and forms a continuous protective film.

3) Wet coating: using a liquid having excellent wetting properties, the surface of the powder becomes homogeneously coated by a thin liquid film. The film is then solidified by drying-evaporating or cooling, allowing to obtain a dense coating film.

In an embodiment of the invention, the primary coating film of the materials is obtained by a wet coating and drying-evaporating approach. However only few liquids allow to obtain a dense surface coating after drying-evaporating the liquid. We discovered that the formation of a crystalline solid after drying is highly undesired, since during crystal formation large parts of the surface can become uncoated. In this embodiment a solution is used which after drying-evaporating results in a glassy coating. We observed that by using a glass forming liquid excellent surface coverage can be obtained. Glass forming liquids are for example solutions of poly-phosphate, -borates or -silicates. Polysilicates of alkali minerals are called "water glass", they are compounds that are transparent solids, having high melting points (above 800° C.) and being water soluble. A known example of water glass is a solution of disodium pentasilicate $Na_2Si_5O_{11}$ in water. It is not clear if Na is tolerated in Li batteries so one embodiment focuses on the Li substitute lithium polysilicate $Li_2Si_5O_{11}$. Other examples of liquid glass are polyphosphates, such as $LiPO_3$ solutions in water, or polyborates like $LiBO_2$ solutions.

To summarize: this embodiment provides the use of liquid glass for the pristine wet coating step. We refer to liquid glass and water glass as a solution which after evaporation and drying forms a glass and not a crystal. A glass is an amorphous solid, which is capable of passing continuously into the viscous liquid state. The use of liquid or water glass allows to obtain a dense, thin inorganic coating layer.

A low base content obtained by a lithium acceptor: The current invention utilizes a unique feature: the pristine glass coating may be a strong lithium acceptor. For example, in the embodiment described before, after a liquid coating of the cathode powder and drying-evaporating to form a solid glassy coating layer, the base content is similar or even higher than for the original cathode powder. At relatively low temperature it has a strong desire to react with lithium. The ability to react already at low temperature with surface lithium is surely related to the good surface wetting ability of the glassy coating. The soluble surface base of the cathode powder may contain lithium (but it is not an impurity in the sense of a secondary phase, it is merely a surface property). Thus the surface base is a lithium donator. As an example: after immersing the powder into water Li containing surface compounds dissolve, as a result $Li_2CO_3$ and LiOH dissolve and the pH increases. The dissolved lithium compounds originate from the "soluble base". The lithium on the surface is thermodynamically less bound than the lithium in the bulk. Therefore it is possible to remove lithium from the surface but not from the bulk by using suitable techniques. A suitable technique is the surface delithiation by a glassy coating layer which has Li accepting properties. Example reactions are:

LiPO$_3$+2LiOH→Li$_3$PO$_4$+H$_2$O,

Li$_2$Si$_5$O$_{11}$+8LiOH→5Li$_2$SiO$_3$+4H$_2$O, or

LiBO$_2$+2LiOH→Li$_3$BO$_3$+H$_2$O.

In an embodiment of the invention, a controlled heat treatment of the primary glassy coated powder allows to decompose the surface base without attacking the bulk. A typical treatment temperature is 300-500° C. At lower temperatures the surface base is not sufficiently decomposed. At higher temperature the delithiation reactions continues beyond the decomposition of surface base, and as a result the bulk phase of the cathode powder is attacked. During further reaction the glass would decompose, lithium would be extracted from the bulk until a high Li stoichiometric crystalline product (Li$_3$PO$_4$, Li$_3$BO$_3$ or Li$_2$SiO$_3$) is formed, and the cathode material also re-creates the surface base. Contrary to these high Li stoichiometric crystalline products, the silicate, phosphate and borate compounds having lithium accepting properties of the present invention are low lithium stoichiometric silicate, phosphate or borate compounds.

We speculate that the narrow temperature range is related to the reactivity of surface and bulk oxygen. Lithium is very mobile already at room temperature (otherwise the cathode material would not be an "intercalation material"). However, de-intercalated cathode materials are thermodynamically unstable. A chemical deintercalation is only possible with very strong oxidizers, and deintercalated compounds collapse at sufficient high temperature (about 400° C.) and release oxygen.

For example:
Li$_{1+x}$M$_{1-x}$O$_2$→de-intercalation of 2x Li→Li$_{1-x}$M$_{1-x}$O$_2$→(1−x)LiMO$_2$+x O$_2$. So, the reaction of bulk lithium is impossible as long as the bulk oxygen is immobile, whereas under similar conditions surface oxygen and surface base might already be reactive. This explains the relative narrow T range where a reduction of only surface base by Li accepting glassy coating happens.

The coating film of the final product originates from a glass, but it is not the pristine applied coating. The coating film is the result of the reaction of the glass with lithium. The lithium is supplied by the Li containing soluble surface base. Thus by the reaction of the glass with lithium the surface base is decomposed and the amount of soluble base is dramatically decreased. Therefore the cathode materials of the present invention have excellent high temperature storage properties when charged batteries are exposed to heat.

We believe that the secondary coating is a double shell coating where the outside of the coating layer still has the pristine glass composition but the inside shell has a higher Li stoichiometry, eventually being a nano-composite of pristine glass (for example Li$_2$Si$_5$O$_{11}$) and small amounts of the lithiated phase (for example Li$_2$SiO$_3$).

To summarize: an important aspect of the current invention is that the pristine glassy surface layer has Li accepting properties, and by applying a controlled temperature treatment within a narrow temperature range the glassy coating layer partially reacts with the surface base, thereby forming a secondary coating and consuming the surface base.

Soluble surface base: for the evaluation of slurry stability and stability during high temperature storage of final cells—as discussed before—the soluble base is an important factor. In the following we will explain "soluble base" and the mechanism to decrease the soluble base using experimental examples. If the cathode powder is immersed in water the surface compound dissolves and causes an increase of pH, thus we call it "soluble base". Lithium located near to the surface is thermodynamically less stable than lithium in the bulk. It can dissolve (by ion exchange) or it can react with molecules within the atmosphere. Contrary to this, the lithium in the bulk is thermodynamically more stable since it cannot be dissolved, and hence is less reactive.

As the lithium near to the surface is reactive, in the most simple case it will bind atmospheric oxygen to the surface, forming an oxygen-lithium surface compound. If the atmosphere contains moisture then hydrogen-oxygen-lithium surface compounds can form. If the cathodes containing these surface compounds are immersed in water the surface compound will dissolve. In the case of oxygen-lithium and in the case of hydrogen-oxygen-lithium surface compounds the dissolved compound is lithium hydroxide. In a more complex case the atmosphere contains carbon, for example in the form of carbon dioxide or organic radicals. Then the surface compounds—besides of oxygen and lithium, eventually hydrogen—also contains carbon. If the cathodes with a carbon containing surface compound are immersed the compound dissolves and lithium carbonate is formed. Additionally Li near to the surface can go dissolve by an ion exchange reaction Li+→H+. All these reactions form dissolved bases in the form of LiOH or Li$_2$CO$_3$. So the "soluble base" is not an impurity but it is rather a surface property, it is the ability of the cathode to perform the above mentioned reactions by the presence of reactive lithium surface compounds.

The amount and composition of the base can be qualitatively (hydroxide versus carbonate) and quantitatively (mol/g cathode) determined by pH titration. In the pH titration the cathode is immersed in water, the soluble base dissolves, and after filtering, the amount and type of dissolved base is obtained by monitoring the pH profile. This mechanism is explained in co-pending application EP11000945.3. If all soluble base is dissolved (that means all reactive surface lithium compounds have reacted with water) then typically the creation of more surface compounds is stopped (or slowed down) because lithium in the bulk is thermodynamically more stable than Li on the surface. Practically the lithium which goes to dissolution is a surface property and not an impurity. If the soluble surface compounds are removed and the sample is dried and reheated then the soluble base (meaning reactive lithium surface compounds) is restored. The restoration easily happens in the case of LNMC as will be explained next.

Lithium transition metal oxides which contain manganese and nickel have a Lithium non stoichiometric range. As an example, Li$_{1+x}$M$_{1-x}$O$_2$ with M=Ni$_{0.5}$Mn$_{0.3}$Co$_{0.2}$, for sufficient small x, is thermodynamically stable. Such compounds will be able to recreate soluble base during an equilibration. An equilibration is a temperature treatment at sufficient high temperature for a sufficient time in a given atmosphere. During equilibration, surface lithium compounds are reformed at the surface. This requires that lithium diffuses from the bulk to the surface. This obviously would create cationic vacancies which are energetically non-preferred. So oxygen needs to be released from the sample as well, which deletes the cationic vacancies. So the restoration of soluble surface base will happen at a temperature when the bulk oxygen equilibrates.

Hence for a the recreation of surface base 2 mechanisms are required:
1) Li diffusion from the bulk to the surface (which would create a cationic vacancy), and
2) local rearrangement of cations and diffusion of oxygen, including the release of oxygen to the atmosphere, which process annihilates the cationic vacancy.

For such processes to occur at a reasonable rate a minimum temperature is required. Obviously process 1) (Li diffusion) happens already at room temperature (otherwise the cathode could not work at room temperature in a battery). Process 2) involves an oxygen equilibration which typically happens at temperatures above 400-500° C.

Treatment temperature: it is advantageous to establish the optimum treatment temperature of the pristine coating layer. If the temperature is too low then surface base is not sufficiently decomposed. If the temperature is too high then surface base is restored as explained above, which continuously reacts with the glassy coating. At the optimum treatment temperature a part of the glassy coating has reacted with the surface base. If the temperature is too high all glassy coating has reacted with lithium and the fully lithiated crystalline phase (fx. $Li_2SiO_3$) forms.

Why does the base increase at higher temperature? At higher T Li from the bulk continuously replaces surface lithium which again reacts with the coating layer. This process will continue until the glassy coating layer is fully lithiated (and usually not anymore glass phase). Then the process will continue to restore surface base until the equilibrium is reached, the surface containing the equilibrium soluble base and additional the lithium in the fully lithiated coating layer. These contributions add up to a value which is larger than the base content of an uncoated reference sample.

Coating thickness: the glassy coating may be thick enough so that it can decompose the Li containing surface base without itself becoming fully lithiated. If the glassy surface coating is too thick then the cathode performance deteriorates because of the low conductivity and a lower content of electrochemically active material. In the case of Li polysilicate $Li_2Si_5O_{11}$ in an embodiment the coating level is between 0.1 to 0.6 mol % of $Li_2Si_5O_{11}$ per mol $LiMO_2$ (this corresponds from about 1000 ppm to 1% by weight silicon).

The invention is further illustrated in the following examples:

Example 1: Preparation of a Pristine Glass-Coated Cathode Powder

This example illustrates the preparation of cathode powders, being free of sulfate impurity and having a pristine (i.e. non-heat treated) glassy coating. As coated $LiMO_2$ precursor an example cathode material $LiMO_2$ with $M=Ni_{0.5}Mn_{0.3}Co_{0.2}$ (or "532" compound) and an average particle size of 10 μm is used. The precursor is prepared from a blend of mixed metal hydroxide MOOH and $Li_2CO_3$ and has a Li:M ratio of about 1.05. Firing is performed in air at 930° C. for 10 h. The MOOH is prepared by precipitation of a metal sulfate solution with NaOH and $NH_4OH$ solution. The MOOH has a tap density of about 1.8 g/cm³. Such mixed metal hydroxides typically contain 0.3-0.6 wt % of sulfate impurity. The $LiMO_2$ precursor contains 0.53 wt % of sulfate, being in the form of $Li_2SO_4$ salt impurity. As it is desired to investigate the glassy coating without cross contamination by the $Li_2SO_4$, the $LiMO_2$ precursor is first washed in water, followed by drying. This treatment removes most of the sulfur, resulting in a low sulfate impurity of 0.041 wt %. Table 1 illustrates the preparation process, and FIG. 1 shows a SEM micrograph of the precursor after removing sulfate impurity by washing.

TABLE 1

Preparation of samples

| | Preparation |
|---|---|
| EX0296 | Origin: Blend of MOOH + $Li_2CO_3$, Li:M ≅ 1.05<br>Firing: air, 930° C., 10 h |
| EX0306 | Origin: EX0296<br>Washing (1 kg/1 L water), filtering & drying |

A glassy coating is achieved by a treatment which is called "slurry doping". A suitable amount of water (approx. 300 ml/kg), containing an appropriate amount of dissolved $Li_2Si_5O_{11}$ is added to 2 kg of the precursor, resulting in a slurry of high viscosity. Different samples are prepared containing 0, 0.03, 0.1 and 0.3 mol % $Li_2Si_5O_{11}$ per 1 mol of $LiMO_2$, respectively. After stirring the slurry is dried at 150° C. in air, followed by sieving. Practically all dried powder is recovered after sieving, so the final silicate content of the cathode powder will be near to the target value. During drying most of the $Li_2Si_5O_{11}$ precipitates as a thin glassy film onto the surface of the particles, including the pores and gaps between grains. In this way a precursor powder is achieved which has (1) a low sulfate impurity and (2) is coated by thin layer of glass.

Example 2: Preparation of a Series of Final Test Samples

A series of final test samples is prepared by heat treatment in air of the pristine glass-coated cathode powder sample of Example 1. The heat treatment temperature varies between 200 and 600° C.; treatment time is 5 h. Sample size is 150 g. The content of soluble base is measured by pH titration. Coin cells are prepared, the discharge capacity and irreversible capacity of the first cycle between 4.3-3.0 V are measured, whereafter the samples are tested under harsh conditions: cycling between 4.5-3.0V, charge and discharge after cycle 3 at 1 C rate (1 C=180 mA/g). Of interest is a) the reversible capacity and b) the cycle stability (fade rate as %/100 cycles). Table 2 lists the obtained results, i.e. the performance as a function of $Li_2Si_5O_{11}$ coating level and heat treatment temperature.

TABLE 2

| | 0 mol % | | | | 0.03 | 0.1 mol % | | | |
|---|---|---|---|---|---|---|---|---|---|
| | Base | QD | Qirr | F | Base | Base | QD | Qirr | F |
| 200° C. | 28.90 | 171.5 | 9.6 | 56.0 | 29.9 | 27.7 | 170.5 | 9.9 | 69.8 |
| 300° C. | | | | | 30.8 | 26.9 | 173.2 | 9.7 | 40.4 |
| 400° C. | 36.70 | 175.2 | 9.1 | 52.7 | 35.6 | 27.3 | 174.0 | 9.7 | 26.8 |
| 500° C. | | | | | 56.5 | 50.6 | 171.9 | 10.2 | 51.7 |
| 600° C. | 43.8 | 171.1 | 11.0 | 43.2 | 79.3 | 94.8 | 170.6 | 10.4 | 57.5 |

| | 0.3 mol % | | | |
|---|---|---|---|---|
| | Base | QD | Qirr | F |
| 200° C. | 28.10 | 168.0 | 10.8 | 78.1 |
| 300° C. | 26.50 | 169.7 | 10.6 | 71.1 |
| 400° C. | 25.50 | 171.6 | 10.5 | 36.5 |
| 500° C. | 48.9 | 169.1 | 11.1 | 61.1 |
| 600° C. | 94.0 | 166.9 | 11.8 | 72.8 |

(Soluble) Base is in μmol/g of cathode, QD is 1$^{st}$ cycle discharge capacity at 0.1 C (mAh/g) measured between 4.3 and 3.0V, Qirr is the irreversible capacity in % and F is the fade rate during 50 cycles of harsh cycling extrapolated to 100 cycles. Cycling scheme: cycles 1-3 rate performance measurements at resp. 0.1 C, 0.5 C, 1 C with cycling between 3.0-4.3V, Cycles 3-50:1 C charge, 1 C discharge, all cycles 3.0-4.5V.

Obviously, at 400° C. the best performance is achieved. Under all conditions (0, 0.03 mol. 0.1 mol %, 0.3 mol %) the cycle stability (values of Qirr and F) as well as the reversible capacity is at its optimum. At the same time the base content is still small. We also observe that $Li_2Si_5O_{11}$ coated samples, after heat treatment to about 300-400° C. show much improved cycle stability (expressed by the fade rate F).

Similar experiments are repeated with different pristine coated cathode powders (being more spherical and having higher tap density). We consistently observe a maximum of capacity and a tow soluble base content, with a much improved cycle stability for 0.05-0.5 mol % $Li_2Si_5O_{11}$ coated samples, after a heat treatment at about 400° C.

Example 3: Preparation of a Series of Final Test Samples without Intermediate Wash An example pristine glass-coated cathode product $LiMO_2$ ($M=Ni_{0.5}Mn_{0.3}Co_{0.2}$) is prepared as described in Example 1. However, for preparing the precursor cathode powder a different—high density—MOOH is used (tap density>2.0 g/cm$^3$). In this example no intermediary wash is performed. The sulfur content of the precursor sample is about 0.4 mol %. This example will demonstrate that $Li_2Si_5O_{11}$ glassy coated samples, even if sulfur is present, have good cycle stability at high rate, show improved capacity and have reduced content of soluble base.

A $Li_2Si_5O_{11}$ coating is applied similar as described in Example 1, with the exception that the cathode precursor powder is not washed. Samples with 2 coating levels, 0.1 and 0.3 mol % are prepared. These coated samples undergo a heat treatment and testing similar as described in Examples 1 & 2, with the exception that only the harsh testing was applied, thus the capacity and irreversible capacity are obtained at 0.1 C rate between 4.5 and 3.0V. Table 3 lists the obtained results: Compared with the reference sample (which is the precursor or "core" used for the coating) a dramatic reduction of soluble base content is observed. The cycle stability under harsh conditions almost reached that of the non coated sample. The 0.1% coated sample, after heat treatment, shows a clear improved 1$^{st}$ cycle capacity. Best overall performance is obtained at 0.1 mol % coating level after a heat temperature of 400° C.

TABLE 3 base content and electrochemical performance obtained for 0.1 and 0.3 mol % $Li_2Si_5O_{11}$ coated product, as a function of heat treatment temperature

| | 0.1 mol % | | | | 0.3 mol % | | | |
|---|---|---|---|---|---|---|---|---|
| | Base | QD | Qirr | F | Base | QD | Qirr | F |
| 200° C. | 61.00 | 192.82 | 10.47 | 39.3 | 60.40 | 189.24 | 11.70 | 64.5 |
| 300° C. | 56.70 | 192.24 | 10.81 | 26.9 | 55.20 | 189.08 | 12.20 | 35.0 |
| 350° C. | | | | | 53.90 | | | |
| 400° C. | 51.40 | 194.05 | 11.14 | 26.6 | 41.30 | 191.47 | 11.90 | 27.8 |
| 450° C. | | | | | 39.40 | | | |
| 500° C. | 119.30 | 190.66 | 11.71 | 15.6 | 108.50 | 188.51 | 12.21 | 33.4 |
| 600° C. | 170.20 | 188.64 | 12.89 | 19.4 | 252.70 | 184.85 | 13.40 | 17.9 |
| Uncoated reference (=precursor) | | | | | | | | |
| | 85.80 | 189.25 | 12.35 | 21.3 | | | | |

Cycling scheme: cycles 1-3 rate performance measurements at resp. 0.1 C, 0.5 C, 1 C with cycling between 3.0-4.5V, Cycles 3-50:1 C charge, 1 C discharge, all cycles 3.0-4.5V.

Example 4: Other Examples of Glassy Coating

This example shows that there are other example embodiments of coatings. In this example the washed cathode precursor $LiMO_2$ with $M=Ni_{0.5}Mn_{0.3}Co_{0.2}$ of Example 1 is used. Slurry doping is performed in the same manner as in Example 1, with the exception that instead of dissolved $Li_2Si_5O_{11}$ other lithium chemicals (in wet solution) are used. The solution used for slurry drying is prepared by dissolve and add stoichiometric controlled amounts of LiOH to a diluted acid solution:

Boric acid: $H_3BO_3 + LiOH \rightarrow LiBO_2 + 2H_2O$

Polyphosphoric acid: $HPO_3 + LiOH \rightarrow LiPO_3 + H_2O$ $LiPO_3$, obtained from dried $LiPO_3$ solution is a glass, as well as a Li acceptor: $LiPO_3 + 2LiOH \rightarrow Li_3PO_4 + H_2O$. $LiBO_2$, as it contains boron, can also form a glass.

After slurry coating the samples are dried, and fired for 5 h in air at different temperatures. Final samples are tested for surface area, coin cell performance and content of soluble base. Table 4 lists the preparation conditions and obtained results. The soluble base content is in µmol/g of cathode, QD is the 1$^{st}$ cycle discharge capacity at 0.1 C (mAh/g), and F is the fade rate during 50 cycles of harsh cycling extrapolated to 100 cycles (see cycling scheme below). Table 4 also contains some data of Example 2; but for a coating with 0.1 mol % $Li_2Si_5O_{11}$. The table shows that the $LiPO_3$ and $LiBO_2$ coatings, at the different treatment temperatures, give a less significant improvement compared to the results of Example 2, whereas $Li_2Si_5O_{11}$ coated cathodes, near to 400° C., show a very sharp maximum of capacity and sharp minimum of cycle stability (energy fade rate), and at the same time, have a still lower base content than the reference.

TABLE 4

Preparation and testing results

| Added to 1 mol $LiMO_2$ | Heating T (° C., air) | QD mAh/g | Qirr (%) | Fade (%/100) | Base µmol/g |
|---|---|---|---|---|---|
| 0.2 mol % $LiPO_3$ | 200 C./5 h | 170.47 | 9.74 | 44.72 | 36.2 |
| | 400 C./5 h | 172.77 | 9.15 | 40.79 | 51.6 |
| | 700 C./5 h | 168.91 | 11.32 | 47.95 | 47.5 |
| | 930 C./5 h | 169.21 | 11.94 | 35.95 | 52.5 |

TABLE 4-continued

Preparation and testing results

| Added to 1 mol LiMO$_2$ | Heating T (° C., air) | QD mAh/g | Qirr (%) | Fade (%/100) | Base µmol/g |
|---|---|---|---|---|---|
| 0.5 mol % LiBO$_2$ | 200 C./5 h | 171.69 | 9.55 | 61.44 | 64.9 |
| | 400 C./5 h | 173.00 | 9.51 | 53.65 | 74.7 |
| | 700 C./5 h | 169.72 | 10.61 | 51.35 | 135.6 |
| | 930 C./5 h | 168.86 | 11.47 | 41.42 | 144.5 |
| Reference H$_2$O | 200 C./5 h | 171.47 | 9.58 | 70.38 | 28.9 |
| | 400 C./5 h | 175.16 | 9.12 | 61.25 | 36.7 |
| | 700 C./5 h | 171.07 | 11.09 | 52.21 | 43.8 |
| | 930 C./5 h | 168.58 | 12.08 | 47.07 | 43.6 |
| Example 1 Li$_2$Si$_5$O$_{11}$ | 200 C./5 h | 170.47 | 10.12 | 59.49 | 27.6 |
| | 400 C./5 h | 171.74 | 9.64 | 33.40 | 32.7 |
| | 700 C./5 h | 167.34 | 11.31 | 57.64 | 134.4 |
| | 930 C./5 h | 167.56 | 13.14 | 52.21 | 88.5 |

Cycling scheme: cycles 1-3 rate performance measurements at resp. 0.1 C, 0.5 C, 1 C with cycling between 3.0-4.3V, Cycles 3-50:1 C charge, 1 C discharge; all cycles 3.0-4.5V. Fade rate calculated from energy (capacity × average voltage), extrapolated to 100 cycles.

Example 5: Li$_2$Si$_5$O$_{11}$ Coated Cathodes with Higher Ni Content

When increasing the Ni content in LiNMO we achieve higher capacity but, at the same time, the content of soluble base increases, which is highly disadvantageous for some applications. This example shows that Li$_2$Si$_5$O$_{11}$ coating allows to reduce significantly the base content of LiMO$_2$ materials, where M=Ni$_{0.6}$Mn$_{0.2}$Co$_{0.2}$. We will refer to this composition as "622". Here also, for example Li$_2$Si$_5$O$_{11}$ coated materials, we observe a clear optimum of performance at about 400° C. treatment temperature. Similar as in Examples 1-3 Li$_2$Si$_5$O$_{11}$ pristine coated cathode materials are prepared from washed (sulfate free) and non-washed precursors by slurry doping, and this is followed by a heat treatment at 200-500° C.

Figure 2:
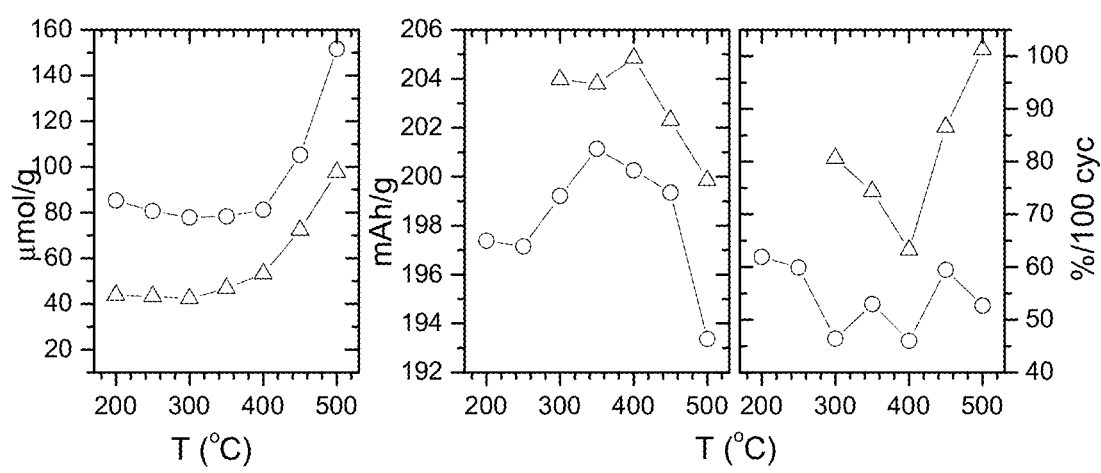
FIG. 2 shows the properties (base content in μmol/g, capacity in mAh/g, cycle stability in % per 100 cycles) of coated "622" samples as function of treatment temperature (° C.).

Because a "622" compound has a high base content, the coating content is set at 0.15 mol % Li$_2$Si$_5$O$_{11}$ per 1 mol LiMO$_2$. The typical base content of a reference sample is 85-110 µmol/g. Compared to this value, Li$_2$Si$_5$O$_{11}$ coated cathodes obtained from washed LiNMO have 40-50 µmol/g, whereas Li$_2$Si$_5$O$_{11}$ coated cathodes obtained from non-washed LiNMO have about 80 µmol/g. Table 5 lists the preparation conditions and obtained results. FIG. 2 shows the properties of Li$_2$Si$_5$O$_{11}$ coated LiNi$_{0.6}$Mn$_{0.2}$Co$_{0.2}$O$_2$ as function of treatment temperature: the soluble base content is in µmol/g of cathode, Q is the 1$^{st}$ cycle discharge capacity at 0.1 C (mAh/g), and F is the fade rate during 50 cycles of harsh cycling extrapolated to 100 cycles. In the figure: O: non-washed samples, Δ washed samples. We observe a clear optimum of performance near 400° C. At lower and higher temperature inferior cycle stability is observed. For Li$_2$Si$_5$O$_{11}$ coated cathodes obtained from non-washed precursor, we also observe a clear minimum of base content.

TABLE 5

Preparation and testing results

| Added to 1 mol LiMO$_2$ | Heating T (° C., air) | QD mAh/g | Qirr (%) | Fade (%/100) | Base umol/g |
|---|---|---|---|---|---|
| Non washed precursor | 200 C./5 h | 197.4 | 11.0 | 61.9 | 85.3 |
| | 250 C./5 h | 197.1 | 11.2 | 59.9 | 80.6 |

TABLE 5-continued

Preparation and testing results

| Added to 1 mol LiMO$_2$ | Heating T (° C., air) | QD mAh/g | Qirr (%) | Fade (%/100) | Base umol/g |
|---|---|---|---|---|---|
| 0.15 mol % Li$_2$Si$_5$O$_{11}$ | 300 C./5 h | 199.2 | 11.2 | 46.4 | 77.9 |
| | 350 C./5 h | 201.1 | 11.1 | 53.0 | 78.3 |
| | 400 C./5 h | 200.3 | 11.2 | 46.0 | 81.3 |
| | 450 C./5 h | 199.3 | 11.2 | 59.5 | 105.3 |
| | 500 C./5 h | 193.4 | 12.0 | 52.7 | 151.7 |
| Washed precursor | 200 C./5 h | | | | 43.7 |
| | 250 C./5 h | | | | 43.3 |
| 0.15 mol % Li$_2$Si$_5$O$_{11}$ | 300 C./5 h | 204.0 | 10.2 | 80.6 | 42.4 |
| | 350 C./5 h | 203.8 | 10.4 | 74.3 | 46.7 |
| | 400 C./5 h | 204.8 | 10.3 | 63.2 | 53.3 |
| | 450 C./5 h | 202.3 | 10.5 | 86.5 | 72.4 |
| | 500 C./5 h | 199.8 | 11.1 | 101.3 | 97.6 |

Cycling scheme: cycles 1-3 rate performance measurements at resp. 0.1 C, 0.5 C, 1 C with cycling between 3.0-4.5V, Cycles 3-50:1 C charge, 1 C discharge, all cycles 3.0-4.5V.

Example 6: XPS and SEM Measurements

This Example describes the investigation of 3 LiMO$_2$ samples of Example 2, (M=Ni$_{0.5}$Mn$_{0.3}$Co$_{0.2}$) coated with 0.3 mol % Li$_2$Si$_5$O$_{11}$, and heat treated at 200° C. (EX6.1), 400° C. (EX6.2) and 600° C. (EX6.3), using X-ray Photoelectron Spectroscopy (XPS) and high resolution SEM, to support the findings that at intermediate temperatures (400° C.) there is an optimum in battery performance (lowered base content, improved fade performance).

The experiment is designed to prove that:
1) At too high temperatures (600° C.) there is a strong increase in base content accompanied by a structural change in the pristine Li-silicate coating.
2) At too low temperatures (200° C.) no structural changes occurs in the pristine Li-silicate coating.
3) At intermediate temperatures (400° C.) an optimum is reached in battery performance due to the diffusion of a small amount of Li (originating from the surface) into the silicate layer and the consumption of surface base during this Li-diffusion.
4) The Li-silicate layer forms a continuous overlayer and the grain boundaries are closed when the Li-silicate is heat-treated at 400° C.

XPS Data

The results of the C, Si and Li spectra are summarized in Table 6.

TABLE 6

Overview of apparent atomic concentrations (at %) measured in the surface layer after deconvolution of the C 1s, Si 2s and Li 1s spectra into their different contributions.

| | Element | | | | | | | |
|---|---|---|---|---|---|---|---|---|
| | C 1s | | | | Si 2s | | | |
| | eV | | | | | | | |
| | | | | | 154.1 Li-poor silicate | 152.7 Li-rich silicate | Li 1s 54.7 Li$^+$ | Li/Si ratio (corrected for Li in Li$_2$CO$_3$) |
| Sub-species | 284.8 C—H | 286.5 C—O | 288.0 C=O | 289.7 —CO$_3$ | | | | |
| EX6.1 | 8.4 | 1.4 | <1.0 | <1.0 | 15.0 | / | 6.0 | 0.4 |
| EX6.2 | 10.2 | 1.3 | <1.0 | <1.0 | 14.5 | / | 7.6 | 0.5 |
| EX6.3 | 10.5 | <1.0 | <1.0 | 2.5 | / | 7.2 | 19.1 | 2.0 |

Conclusions for Table 6:
1 C 1s:
  1.1 C—H, C—O and C=O are typical contaminations always observed with XPS.
  1.2 The $CO_3$ peak at 289, 7 eV is typical for the presence of $Li_2CO_3$ surface base. As mentioned in previous examples, other surface base (such as LiOH) are also present but cannot be identified using XPS.
  1.3 Small decrease of $CO_3$ from 200° C. to 400° C.
  1.4 Strong increase of $CO_3$ between 400° C. and 600° C.
2 Si 2s:
  2.1 At 200° C. and 400° C., the silicate is present in a Li-poor form (154.1 eV).
  2.2 Between 400° C. and 600° C. a transformation occurs into a Li-rich silicate (152.7 eV).
  2.3 Strong decrease of Si between 400° C. and 600° C. due to enrichment of the Li-silicate layer with Li.
3 Li 1s:
  3.1 Slight diffusion of Li to the silicate-coating from 200° C. to 400° C.
  3.2 From 400° C. to 600° C., Li strongly diffuses to the silicate layer at the surface.
4 Li/Si Ratio in the Coating:
  4.1 Li/Si is initially equal to the one of $Li_2Si_5O_{11}$ (Li/Si=0.4).
  4.2 Somewhere between 200° C. and 400° C., the diffusion of Li from the bulk to the surface slowly begins thereby causing an enrichment of the Li-silicate layer with Li (Li/Si ratio increases to 0.5).
  4.3 Above 400° C., the Li-silicate coating is heavily enriched with Li from the bulk and forms $Li_2SiO_3$ (Li/Si increases to 2.0)

The formation of a continuous overlayer of Li-silicate is confirmed by the decrease in Ni and Co signals as compared to uncoated material (Table 7). With increasing temperature, the Li-silicate layer is becoming thicker as can be seen by the further decrease in Ni, Co and O signals.

TABLE 7

Overview of apparent atomic concentrations (at %) measured in the surface layer after deconvolution of the Ni 2p, Mn 2p, Co 2p and O 1s spectra into their different contributions.

| | Sample | | | |
|---|---|---|---|---|
| | Co 2p | Mn 2p | Ni 2p | O 1s |
| eV | 780.2 | 654.0 | 855.2 | / |
| | $CoO_x$ | $MnO_x$ | $NiO_x$ | / |
| Uncoated | 2.3 | 3.3 | 9.7 | 52.4 |
| EX6.1 | 1.3 | 2.2 | 5.3 | 58.8 |
| EX6.2 | 1.0 | 2.7 | 4.0 | 56.7 |
| EX6.3 | <1.0 | 4.3 | 2.2 | 51.0 |

The above XPS data support the following model:
1. At 200° C., the Li-silicate is present as $Li_2Si_5O_{11}$ and the surface base level is similar as in a non-coated product.
2. Between 200° C. and 400° C., a small amount of Li (originating from surface base) diffuses into the silicate layer thereby causing a slight enrichment of the silicate layer and a small decrease in surface base.
3. Between 400° C. and 600° C., the diffusion of Li continues strongly. The silicate becomes very Li-rich. In this Li-rich form, the silicate can act as a $CO_2$-sorber thereby forming $Li_2CO_3$ and increasing the surface base.

SEM Data
SEM data (FIGS. 3.1, 3.2 and 3.3) show that, for all temperatures, the Li-silicate coating forms a continuous overlayer. At 200° C., strong aggregates of Li-silicate are visible and the grain boundaries are open. At higher temperatures (400° C. and 600° C.) the aggregates seem to have melted away and the grain boundaries are clearly closed.

Example 7: Full Cell Testing of Li—Si Coated Cathodes

This example demonstrates that excellent results are obtained with example Li—Si coated cathode material incorporated in real full cells. These cells are winded pouch type with approx. 800 mAh capacity. In the cells 0.1 mol $Li_2Si_5O_{11}$ coated $LiMO_2$ cathode materials—with M=$Ni_{0.5}Mn_{0.3}Co_{0.2}$—are tested.

The example shows results for the following samples, originating from the same mixed MOOH (M=$Ni_{0.5}Mn_{0.3}Co_{0.2}$):
1) EX7.1: Normal reference sample prepared from the low density MOOH of Example 1, fired at 955° C. using a Li:M ratio of 1.035 (without intermediate wash)
2) EX7.2: Washed reference sample, refired at 600° C., 5 h
3) EX7.3: Washed sample, 0.1 mol $Li_2Si_5O_{11}$ coated, refired at 400° C., 5 h
4) EX7.4: Mass Production (MP) line $LiMO_2$ with M=$Ni_{0.5}Mn_{0.3}Co_{0.2}$ prepared from high density MOOH as used in Example 3
5) EX7.5: 0.1 mol % $Li_2Si_5O_{11}$ coated MP line $LiMO_2$ (no intermediary wash, heat treatment at 400° C.)

The results of full cell testing are summarized in Table 8. Bulging is measured by inserting the fully charged cell into an oven, heating within 1 h to 90° C., and measuring the thickness by a suitable thickness gauge directly attached to the cell. Bulging generally depends on the electrolyte chosen, here we use a standard EC/DEC electrolyte which has not been optimized to achieve low bulging.

TABLE 8

Full cell testing of 0.1 mol $Li_2Si_5O_{11}$ coated $LiMO_2$ (M = $Ni_{0.5}Mn_{0.3}Co_{0.2}$) & compared to references

| | Bulging (%) 4.2 V 4 h (15 h) @ 90° C. | Capacity after 500 cycles (%) at 25° C. | Capacity after 350 cycles (%) at 45° C. |
|---|---|---|---|
| EX7.1 | 64.2 (75.5) | 71.4 | 74.5 |
| EX7.2 | 38.5 (53.7) | 87.1 | 68.7 |
| EX7.3 | 18.8 (30.2) | 88.2 | 80.9 |
| EX7.4 | 19.7 (30.8) | 82.0 | 68 |
| EX7.5 | 14.3 (25.4) | 90.7 | 92.3 |

The results show that the high temperature performance of 0.1 mol $Li_2Si_5O_{11}$ coated samples is much better (less bulging, better cycle stability) than that of both references. Cycle stability at room temperature is better as well. Other properties (rate performance, capacity, safety) are similar or slightly better.

The results show that an intermediary wash is not necessary. The 0.1 mol % $Li_2Si_5O_{11}$ coated sample EX7.5 has the best cycle stability at room temperature as well as at 45° C. and it shows the least bulging. Other properties (rate performance, capacity, safety) are similar or slightly better than the references.

Example 8: Method to Prepare Li—Si Coated Cathodes

This example illustrates an example method to produce Li—Si coated cathode material. The method is easy scalable to mass production scale. In Examples 1-3 a good performance is achieved by the "slurry doping method". Cathode precursor powder is immersed in an aqueous $Li_2Si_5O_{11}$ solution to obtain a slurry of relatively high viscosity. In this way a good penetration of the solution into the pores and a 100% surface coverage is achieved. About 300 ml are used for 1 kg product. The slurry is subsequently dried, followed by soft grinding and sieving. However drying of such a slurry at industrial scale requires capital investment and energy, hence it is not very cheap. Therefore it is preferred to investigate if instead of slurry doping a coating can be applied using less water.

Commercial $LiMO_2$ ($M=Ni_{0.5}Mn_{0.3}Co_{0.2}$) is obtained from a mass production line. 1.7 kg of the $LiMO_2$ powder is immersed into a heated 5 L reactor, and smaller amounts of higher concentrated $Li_2Si_5O_{11}$ solution are added during soft agitation. The total amount of $Li_2Si_5O_{11}$ is fixed at 0.1 mol % per 1 mol $LiMO_2$. Ideally the solution is sprayed into the agitated powder. The reactor is connected to a vacuum pump, and during continuous agitation at 80° C., the powder is dried. This process can easily be scaled up to mass production level.

It is observed that the processing becomes easier—the powder becomes less sticky—as smaller amounts of higher concentrated solution is added. The upper limit of the concentration of the solution is attained when the surface coverage of the glass solution deteriorates, especially within open pores. Only if the glassy solution has excellent surface wetting properties good results are expected.

After drying, the powder is heat treated at 400° C. 4 samples are prepared using 400, 300, 200 and 100 ml of solution, for 1.7 kg $LiMO_2$, but respecting the concentration of $Li_2Si_5O_{11}$ of 0.1 mol % per 1 mol $LiMO_2$ (meaning that the 100 ml solution is 4× more concentrated than the 400 ml). The best results are obtained with 100 ml. Table 9 lists the results for reversible capacity and base content. The results are compared with a reference sample which previously has been prepared at a small scale level, using the slurry doping method for the same mass production precursor. With only 60 ml/kg $LiMO_2$ solution similar results as the reference are obtained (a difference of 1 mAh/g capacity and 2 μmol/g base are within experimental scattering). The data clearly demonstrate that smaller amounts of higher concentrated glassy solution can have excellent surface wetting properties, so that the coating process at large scale easily can be performed by using small amounts of higher concentrated glass solution. We speculate that the excellent wetting properties are related to the solution being a dissolved glass (forming a glass after drying) and not a crystalline salt.

TABLE 9

Properties of coated $LiMO_2$ as function of dilution of glassy solution

| Sample | Preparation | QD mAh/g | Qirr % | base μmol/g |
|---|---|---|---|---|
| EX0542 reference | Slurry doping (≈300 ml/kg) | 171.0 | 11.7% | 37.60 |
| EX0775 | 400 ml (≈235 ml/kg) | 168.2 | 12.3% | 42.18 |
| EX0776 | 300 ml (≈180 ml/kg) | 168.9 | 12.3% | 41.19 |
| EX0777 | 200 ml (≈120 ml/kg) | 168.9 | 12.1% | 45.27 |
| EX0778 | 100 ml (<60 ml/kg) | 169.8 | 11.9% | 36.04 |

Example 9: Xray Analysis Confirms Li Accepting Property of Glass Phase

This example displays the Li accepting properties of Li polysilicate glass. The Li accepting character is strong enough to decompose LiOH and $Li_2CO_3$, and hence Li polysilicate glass is strong enough to decompose the Li containing surface base.

Figure 4:
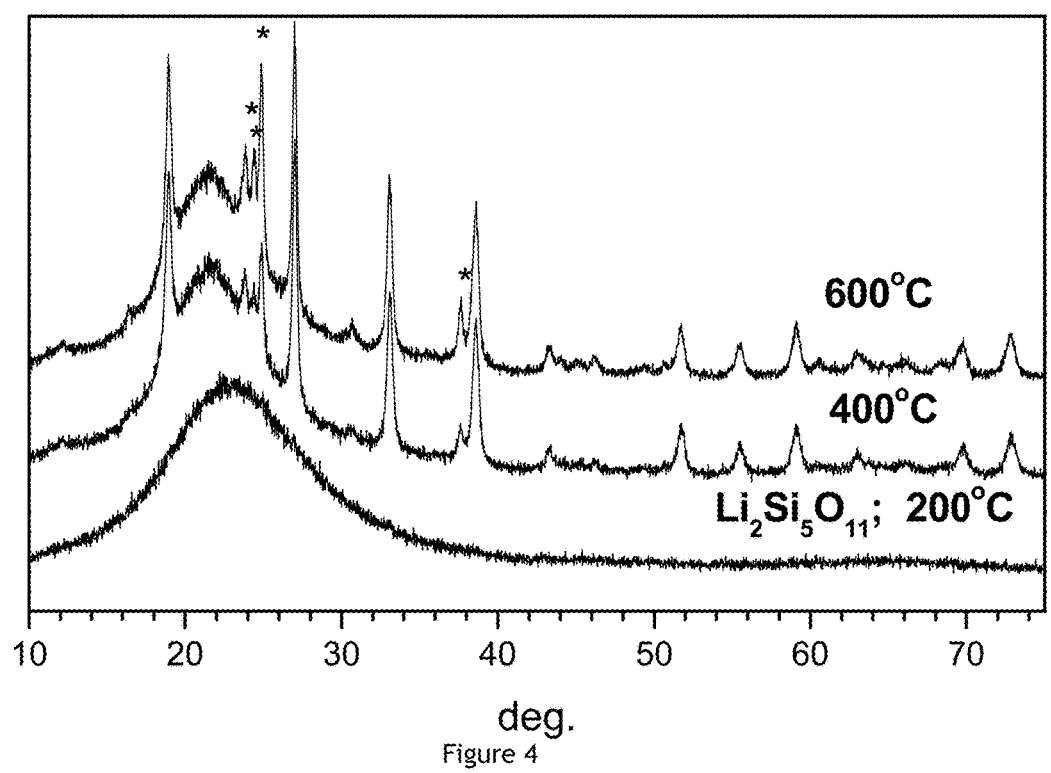
FIG. 4 shows an X-ray diffraction pattern of $Li_2Si_5O_{11}$ liquid glass after drying at 200, 400, 600° C., respectively.

Experiment 9A $Li_2Si_5O_{11}$ liquid glass is dried at 200° C. FIG. 4 shows the result of the X-ray diffraction analysis, indicating that at 200° C. an amorphous glass is obtained. A single very broad peak at about 23 degree is typical for Si-based glass. Thus, coating a cathode material with liquid glass will result, after drying, in a glassy coating. We believe that the glassy coating very well covers the surface of the cathode powder.

Alternatively liquid glass is dried at 400 and 600° C. At these temperatures $Li_2Si_5O_{11}$ disproportionates into a Li-rich crystalline $Li_2SiO_3$ phase and an amorphous glass phase. Almost all sharp peaks are indexed as $Li_2SiO_3$ (PDF 01-070-0330, space group Cmc21). A few minor remaining peaks at 24.85, 23.8 and 37.6° can be indexed as $Li_2Si_2O_5$. The position of the glass phase peak moves left towards 21.5 degree. Obviously the glass phase has a lower Li:Si ratio than 2:5.

It can be concluded that, according to temperature, (1) $Li_2Si_5O_{11}$ coating followed by drying results in a glassy coating;
(2) $Li_2Si_5O_{11}$ disproportionates into $Li_2SiO_3$ and a low lithium glassy phase, which is also a Li acceptor;
(3) As long as not all glass has reacted with lithium, even at 600° C. a glassy coating remains,
(4) No $Li_2CO_3$ is formed, despite that the drying is performed in air, which contains enough $CO_2$ to form $Li_2CO_3$.

Experiment 9B

This experiment illustrates that the Li accepting properties of $Li_2Si_5O_{11}$ are strong enough to decompose $Li_2CO_3$. $Li_2Si_5O_{11}$ liquid glass is dried at 120° C. The glass is grinded and mixed with $Li_2CO_3$ (10 g glass and 4 g $Li_2CO_3$). At 450° C. $Li_2CO_3$ is not very reactive, so to enhance the contact a pellet is pressed and fired at 450° C. for 72 hours in air.

Figure 5:
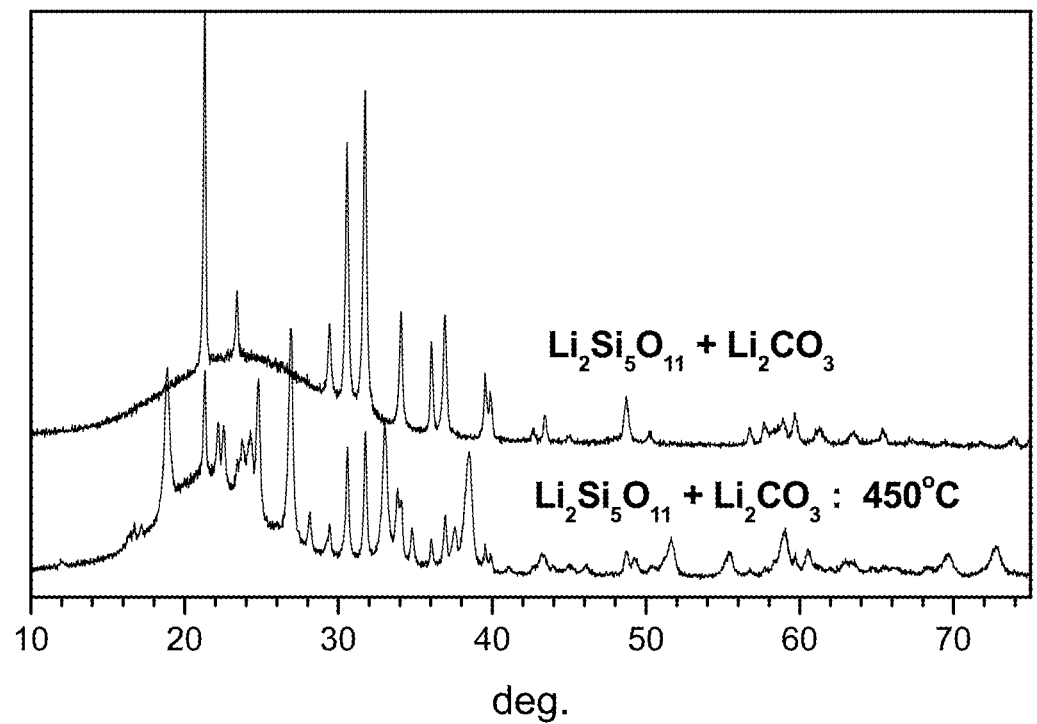
FIG. 5 shows an X-ray diffraction pattern of a mixture of dried $Li_2Si_5O_{11}$ glass and $Li_2CO_3$ before (top graph) and after heat treatment at 450° C. for 72 hours (bottom graph).

Assuming that $Li_2CO_3$ reacts completely with $Li_2Si_5O_{11}$ to form $Li_2SiO_3$ (reaction scheme: $Li_2Si_5O_{11}$+ $4Li_2CO_3 \rightarrow 5Li_2SiO_3 + 4CO_2$) requires a mass ratio $Li_2CO_3$: glass of approx. 0.9:1. In this experiment we use a mass ratio of 1:2.5, meaning that there is a large excess of glass. FIG. 5 shows the results of the X-ray diffraction analysis: the top graph is the XRD pattern for the mixture $Li_2CO_3$:glass, the bottom graph is the XRD pattern for the same mixtures after heating at 450° C. for 72 hr. The glass phase changes (the broad hump moved towards smaller angle and becomes slightly more narrow (12-35 to about 10-30). Diffraction peaks of the $Li_2CO_3$ phase, as well as the intensity of the broad hump (glass phase) clearly decreases, indicating that more than 50% of the $Li_2CO_3$ has been decomposed, partially consuming the glass phase. Additionally $Li_2SiO_3$ peaks (with higher intensity ratio of $Li_2SiO_3$ to glass phase than in Experiment 9A) form. The X-ray diffraction pattern clearly proves that $Li_2Si_5O_{11}$ glass is a Li acceptor, strong enough to decompose $Li_2CO_3$. In the case of excess $Li_2Si_5O_{11}$ at 450° C. a phase mixture forms which contains remaining (but modified) glass and $Li_2SiO_3$, where some of the $Li_2SiO_3$ originates from a decomposition of $Li_2CO_3$ by the glass. The results of the XRD analysis are consistent to the observations by XPS of Example 6 (at about 400° C. the coating layer has—compared to the initial $Li_2Si_5O_{11}$—an increased Li content by having decomposed the surface $Li_2CO_3$).

The invention claimed is:
1. A cathode active material for use in a rechargeable battery, comprising a coated lithium nickel oxide powder or a coated lithium nickel manganese oxide powder, the powder comprising primary particles having a glassy surface coating, wherein the coating comprises a lithium silicate compound, wherein the lithium silicate compound has lithium accepting properties, and wherein the coating comprises a compound having a chemical composition expressed by $Li_{2-x}SiO_{3-0.5x}$, wherein $0<x\leq1.6$.
2. The cathode active material of claim 1, wherein the glassy surface coating further comprises either one or both of a phosphate and borate compound, said compound having lithium accepting properties.
3. The cathode active material of claim 1, wherein the glassy surface coating comprises lithium.
4. The cathode active material of claim 2, wherein the glassy surface coating comprises either one or both of a $Li_{3-2y}PO_{4-y}$ and a $Li_{3-2z}BO_{3-z}$ compound, wherein $0<y<1.5$ and $0<z<1.5$.
5. The cathode active material of claim 1, wherein the glassy coating compound has a composition gradient, wherein the value of x at the surface of the primary particles is lower than the value of x at the outer surface of the glassy coating.
6. The cathode active material of claim 1, wherein the cathode active material comprises between 0.07 and 1 wt % of Si.
7. The cathode active material of claim 2, wherein the cathode active material comprises between 0.1 and 2 wt % P.
8. The cathode active material of claim 2, wherein the cathode active material comprises between 0.03 and 0.5 wt % B.
9. The cathode active material of claim 1, wherein the glassy surface coating consists of nano-composites of $Li_2Si_5O_{11}$ and $Li_2SiO_3$ particles.
10. The cathode active material of claim 1, wherein the cathode active material comprises between 0.05 and 0.5 mol % glassy surface coating.
11. The cathode active material of claim 1, wherein the primary particles are either one of
$Li_aNi_{x'}Co_{y'}N_{z'}O_{2\pm e}A_f$, with $0.9<a<1.1$, $0.5<x'\leq0.9$, $0<y'<0.4$, $0<z'<0.35$, $e<0.02$, $0<f<0.05$ and $0.9<(x'+y'+z'+f)<1.1$; N consisting of one or more elements selected from the group consisting of Al, Mg, and Ti; and A consisting of one or both of S and C; and
$Li_{1+a}M'_{1-a}O_{2\pm b}M''_kS_m$ with $-0.03<a''<0.06$, $b<0.02$, wherein at least 95% of $M'=Ni_{a''}Mn_{b''}Co_{c''}$, with $a''>0$, $b''>0$, $c''>0$ and $a''+b''+c''=1$; and $a''/b''>1$; wherein M'' consists of one or more elements selected from the group consisting of Ca, Sr, Y, La, Ce and Zr, with $0<k<0.1$ in wt %; and wherein $0<m\leq0.6$, m being expressed in mol %.

12. The cathode active material of claim 11, wherein the primary particles are $Li_{1+a}M'_{1-a}O_{2\pm b}M''_kS_m$ with $M'=Ni_{a''}Mn_{b''}Co_{c''}$, and wherein $1.5<a''/b''<3$, and $0.1\leq c''<0.35$.
13. The cathode active material according to claim 12, wherein $0.5<a''<0.7$.
14. A method for preparing the cathode active material of claim 1, comprising:
providing a lithium transition metal based oxide powder,
providing an alkali mineral compound comprising a $Li_{2-x}SiO_{3-0.5x}$ compound, wherein $0<x<2$,
mixing the lithium transition metal based oxide powder and the alkali mineral compound to form a powder-mineral compound mixture, and
heat treating the mixture at a temperature T between 300 and 500° C., whereby a glassy surface coating is formed comprising a $Li_{2-x''}SiO_{3-0.5x''}$ compound, wherein $x<x''<2$.
15. The method according to claim 14, wherein the heat treatment is performed in an oxygen comprising atmosphere.
16. The method according to claim 14, wherein the alkali mineral compound is provided as a dry nanometric powder; and during the heat treatment of the mixture, the powder is sintered and adheres to a surface of the transition metal based oxide powder in the form of a glassy coating.
17. The method according to claim 14, wherein the alkali mineral compound is provided as an aqueous solution of the alkali mineral compound; and during the heat treatment of the mixture, water from the aqueous solution evaporates and the compound dries to form a glassy coating on a surface of the metal based oxide powder.
18. The method according to claim 14, wherein the lithium transition metal based oxide powder consists of either one of
$Li_aNix'Co_{y'}Nz'O_{2\pm e}A_f$, with $0.9<a<1.1$, $0.5<x'<0.9$, $0<y'<0.4$, $0<z'<0.35$, $e<0.02$, $0<f<0.05$ and $0.9<(x'+y'+z'+f)<1.1$; N consisting of one or more elements selected from the group consisting of Al, Mg, and Ti; and A consisting of one or both of S and C; and
$Li_{1+a}M'_{1-a}O_{2\pm b}M''_kS_m$ with $-0.03<a''<0.06$, $b<0.02$, wherein at least 95% of $M'=Ni_{a''}Mn_{b''}Co_{c''}$, with $a''>0$, $b''>0$, $c''>0$ and $a''+b''+c''=1$; and $a''/b''>1$; wherein M'' consists of one or more elements selected from the group consisting of Ca, Sr, Y, La, Ce and Zr, with $0<k<0.1$ in wt %; and wherein $0\leq m<0.6$, m being expressed in mol %.
19. The method according to claim 18, wherein the lithium transition metal based oxide powder consists of $Li_{1+a}M'_{1-a}O_{2\pm b}M''_kS_m$ with $M'=Ni_{a''}Mn_{b''}Co_{c''}$, and wherein $1.5<a''/b''<3$, and $0.1\leq c''<0.35$.
20. The method according to claim 19, wherein $0.5\leq a''<0.7$.
21. The method according to claim 14, wherein the alkali mineral compound consists of $Li_2Si_5O_{11}$ or $Li_2Si_2O_5$.
22. The method according to claim 14, wherein the heat treatment of the mixture is performed at a temperature T between 350 and 450° C. for at least one hour.

* * * * *